C. SMITH.
WAGON BRAKE.
APPLICATION FILED MAY 1, 1912.

1,068,458.

Patented July 29, 1913.

WITNESSES
E. N. Callaghan
Myron G. Clear

INVENTOR
CHARLES SMITH,
BY Munn & Co.
ATTORNEYS

UNITED STATES PATENT OFFICE.

CHARLES SMITH, OF DULUTH, MINNESOTA.

WAGON-BRAKE.

1,068,458.   Specification of Letters Patent.   Patented July 29, 1913.

Application filed May 1, 1912. Serial No. 694,316.

*To all whom it may concern:*

Be it known that I, CHARLES SMITH, a citizen of the United States, and a resident of Duluth, in the county of St. Louis and State of Minnesota, have invented a new and useful Improvement in Wagon-Brakes, of which the following is a specification.

My present invention relates to wagon brakes, and more particularly to a brake mechanism especially adapted to spring wagons, my object being to provide a simple, strong and effective mechanism for the purpose mentioned.

Figure 1:
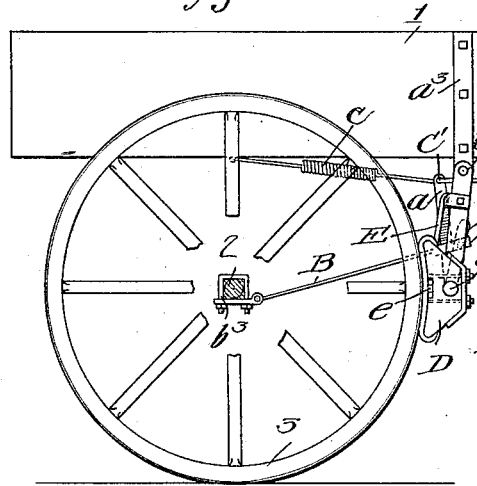
Figure 2:
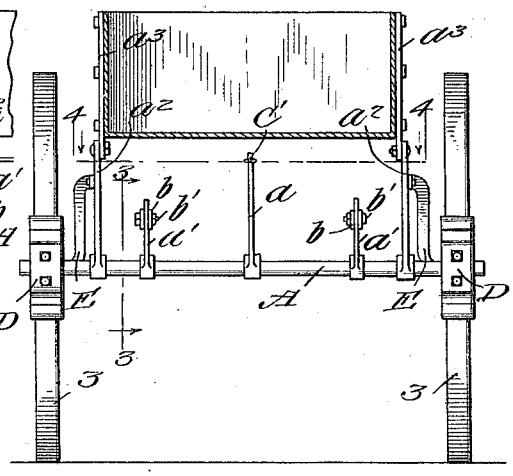
Figure 3:
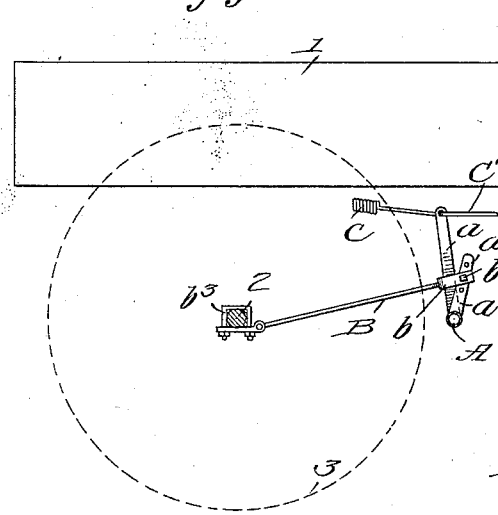
Figure 4:
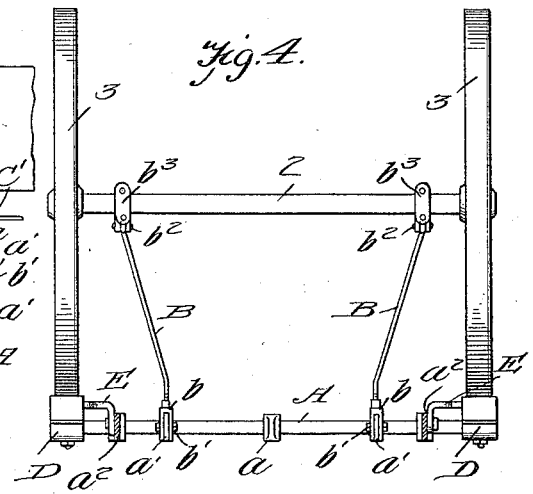

These and other objects of my present invention will be clearly apparent from the following description in which reference is made to the accompanying drawing, forming a part of this specification, and in which, Figure 1 is a side elevation of the rear portion of a wagon, the hub of one rear wheel being broken away, and the rear axle shown in section; Fig. 2 is a front elevation of the parts shown in Fig. 1; Fig. 3 is a vertical sectional view taken on the line 3—3 of Fig. 2; Fig. 4 is a horizontal sectional view taken on the line 4—4 of Fig. 2.

Referring now to these figures, the body of a wagon 1 is shown as mounted above its rear axle 2 which is provided with wheels 3, it being presumed that the body 1 is supported by springs, as is common and well known, in order that the same may move up and down with respect to the axle 2.

In accordance with my invention I provide a brake shaft A having a rigid upstanding brake rod connecting member $a$, and rigid upstanding arms $a'$. The shaft A is supported transversely of the wagon at a point slightly in advance of the rear wheels 3, by means of rigid upstanding hangers $a^2$ having a pivotal connection at their upper ends to straps $a^3$ secured vertically upon the sides of the wagon body 1.

The upstanding shaft arms $a'$ are provided with a series of openings, as particularly shown in Fig. 3, through selected ones of which openings the forked forward ends $b$ of connecting rods B may be connected by means of bolts $b'$. The forked forward ends $b$ of connecting rods B are separate from, and threadedly connected to, said rods whereby these connecting rods, as a whole, may be adjusted in length. The rear ends of the connecting rods B have pivotal connections at $b^2$ with yokes $b^3$ secured about the rear axle 2, said rear ends of the connecting rods being downwardly inclined as shown. Thus forward movement of the brake rod C serves to move the shaft A rearwardly upon the pivots $b'$, the shaft being supported at all times by the hanger $a^2$. When the brake rod C is released the shaft A is moved in a forward direction under the tension of a spring $c$ interposed within a retracting member or rod $c'$ which is connected at its forward end to the upper end of the shaft member $a$, and has a connection at its rear end to the wagon body 1.

Upon the ends of the shaft A are mounted the wheel-engaging members or brake blocks D these members being movable with the shaft toward and away from the wagon wheels 3, and being turnable with respect to the shaft whereby to conform closely to the contour of the wheels when pressed thereagainst. In order to prevent the upper portions of the members D from accidental contact with the wagon wheels 3 when the body 1 moves downwardly, I preferably provide flat spring members E, the inner ends of which are rigidly secured to the shaft hangers $a^2$, and the outer angular ends $e$ of which are secured to the brake members D. These members are so shaped that, when the brake members D are moved out of contact with the wheels 3, they tend to turn the brake members slightly with respect to the brake shaft A, to a position wherein the upper portions of the said brake members are inclined forwardly and thus prevented from accidental contact with the wheels when the wagon body is depressed.

From the fact of the pivotal connections $b^2$ at the rear ends of the connecting rods B, it will be seen that the wagon body 1 is free to move up and down by virtue of its spring support, and that the adjustable connection at $b'$ between the forward ends of the connecting rods B and the shaft arm $a'$ is such as to permit of the adjustment of these parts whereby to cause the shaft A to move through a greater or smaller arc when the brake rod C is pulled. It will be further seen that this connection, together with the adjustment of the connecting rods B as to their length, provides for the adjustment of the length of movement of the shaft A with respect to the wagon wheel.

From the foregoing, it will be apparent that changes may be made in the details of construction and the arrangement of the several parts forming my prevent invention, and I therefore wish to reserve all such as fall within terms of the appended claim.

I claim:—

The combination with a wagon, of a brake-shaft having a rod-connecting member and upstanding arms, the latter of which are provided with longitudinal series of openings, a brake-rod having connection with said member, connecting rods each having a pivotal connection at one end to an axle of the wagon, and being adjustable as to its length, an adjustable pivotal connection carried by the opposite end of each connecting rod and adapted to engage a selected opening of one of said upstanding shaft-arms, wheel-engaging members carried by the shaft, and hangers having pivotal connection with the wagon body for supporting the brake-shaft.

CHARLES SMITH.

Witnesses:
 O. J. LARSON,
 J. L. TREMPE.

---

Copies of this patent may be obtained for five cents each, by addressing the "Commissioner of Patents, Washington, D. C."